United States Patent [19]

Bechte

[11] Patent Number: 5,372,161
[45] Date of Patent: Dec. 13, 1994

[54] VALVE PLATES FOR SINGLE-CONTROL VALVE

[75] Inventor: Veit Bechte, Holzwickede, Germany

[73] Assignee: Friedrich Grohe Armaturenfabrik GmbH & Co., Hemer, Germany

[21] Appl. No.: 835,102

[22] Filed: Feb. 12, 1992

Related U.S. Application Data

[63] Continuation of Ser. No. 577,789, Sep. 4, 1990, abandoned.

[30] Foreign Application Priority Data

Sep. 2, 1989 [DE] Germany .............. 3929147

[51] Int. Cl.5 ........................... F16K 11/074
[52] U.S. Cl. .............. 137/625.17; 137/625.4; 251/368
[58] Field of Search ......... 137/625.17, 625.4, 625.41; 251/208, 314, 368

[56] References Cited

U.S. PATENT DOCUMENTS

| | | | |
|---|---|---|---|
| 3,171,441 | 3/1965 | Schonfeld | 137/625.41 X |
| 3,460,571 | 8/1969 | Moen | 137/625.17 |
| 3,543,799 | 12/1970 | Hayman | 137/625.17 |
| 3,677,516 | 7/1972 | Hicks | 251/208 X |
| 4,130,136 | 12/1978 | Garnier et al. | 137/662.41 |
| 4,331,176 | 5/1982 | Parkison | 251/368 X |
| 4,501,408 | 2/1985 | Pawelzik et al. | 251/314 |
| 4,856,556 | 8/1989 | Mennigmann | 137/625.17 X |

FOREIGN PATENT DOCUMENTS

| | | |
|---|---|---|
| 2590643 | 5/1987 | France . |
| 2711500 | 11/1977 | Germany . |
| 3137774 | 3/1983 | Germany . |
| 3510835 | 10/1986 | Germany . |

*Primary Examiner*—John Rivell
*Attorney, Agent, or Firm*—Herbert Dubno; Andrew Wilford

[57] ABSTRACT

A single-control valve has a normally stationary valve plate formed with hot- and cold-water inlet ports and an outlet port opening at a flat face of the valve plate and a movable control plate having a flat face lying on the valve-plate face and formed with a cavity opening at the control-plate face and juxtaposable over the ports. at least one of the plates and its surface are formed of a hard ceramic, and at least the surface of the other of the plates is formed of a low-friction synthetic resin. The low-friction synthetic resin is polyethylene or polypropylene.

9 Claims, 6 Drawing Sheets

VALVE PLATES FOR SINGLE-CONTROL VALVE

This is a continuation of co-pending application Ser. No. 07/577,789 filed on 4 Sep. 1990 now abandoned.

FIELD OF THE INVENTION

The present invention relates to a single-control valve. More particularly this invention concerns the valve and control plates for such a valve.

BACKGROUND OF THE INVENTION

A standard single-control mixing valve (see U.S. Pat. Nos. 4,621,659 and 4,540,023) used in a single-lever faucet has a normally cylindrical housing centered on an axis and a valve plate closing the bottom of the housing and formed with a hot-water inlet port, a cold-water inlet port, and an outlet port. A control plate sits flat atop this valve plate and is formed with a cavity that normally overlies the outlet port and that can also be brought into registration over the inlet ports, either singly or jointly. A lever pivoted on the housing is connected to this control plate to slide it atop the valve plate, thereby determining the amount of overlap of the control-plate cavity with the inlets to determine the amounts of hot and cold water to be shunted through this cavity to the outlet port.

As described in German patent document 1,291,957 of W. E. Blodgett (based on U.S. application Ser. No. 543,456 filed 22 Mar. 1966) it is standard to make the valve and control plates both of a hard ceramic, and in German Utility Model 8,606,471 of W. Heinzel a system is described where instead of a solid ceramic body a glass plate with a hard ceramic coating is used. In both arrangements there is ceramic-to-ceramic contact at the sliding interface between the valve and control plates. Even though the contact surfaces are always machined to high tolerances so as to be perfectly planar, there is substantial friction between them, making the valve stiff to operate.

This stiffness is countered in part by coating the interface surfaces with a heavy lubricant grease. The result is, of course, a substantial lessening both of static and dynamic friction, but only so long as the grease is present. With time, especially when in the presence of hot water, the grease is carried away so that the valve becomes stiff to operate. Regreasing the contact surfaces is a difficult job entailing dismantling the entire valve after shutting off the water, so the end user of the valve must normally put up with stiff operation once the valve is no longer new.

OBJECTS OF THE INVENTION

It is therefore an object of the present invention to provide an improved plate assembly for a single-control valve.

Another object is the provision of such an improved plate assembly for a single-control valve which overcomes the above-given disadvantages, that is which remains easy to operate even after considerable use.

SUMMARY OF THE INVENTION

A single-control valve has a normally stationary valve plate formed with hot- and cold-water inlet ports and an outlet port opening at a flat face of the valve plate and a movable control plate having a flat face lying on the valve-plate face and formed with a cavity opening at the control-plate face and juxtaposable over the ports. According to this invention at least one of the plates and its surface are formed of a hard ceramic, and at least the surface of the other of the plates is formed of a low-friction synthetic resin.

Thus with the system of this invention the friction between the valve and control plates is extremely low since one of the surfaces is hard ceramic and the other the low-friction synthetic resin. As a result no lubrication of the interface is needed at all. Furthermore it is possible to do away with the requirements of perfect planarity, because the synthetic-resin surface will have some capacity to conform to any nonplanarities of the ceramic body, it being understood that elastically compressible means is provided to urge the two faces together. The synthetic-resin element is substantially cheaper to manufacture than a hard-ceramic one, so that manufacturing costs are substantially reduced.

According to this invention the low-friction synthetic resin is polyethylene or polypropylene. Tests have proven that a valve according to this invention has a service life at least equal to that of the wholly ceramic style of the prior art, that is over 200,000 actuations, with no significant increase in the force needed to actuate it, while with such use the prior-art valves become extremely stiff to operate.

In accordance with a further feature of this invention the other plate is entirely formed of the low-friction synthetic resin. Alternately the other plate comprises a rigid support body and a layer of the low-friction synthetic resin forming the surface on the body and the body is provided on its face with the low-friction synthetic resin. The layer of low-friction synthetic resin is formed as a cap on the body and an adhesive secures the cap to the body. The cap is fixedly anchored to the body.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
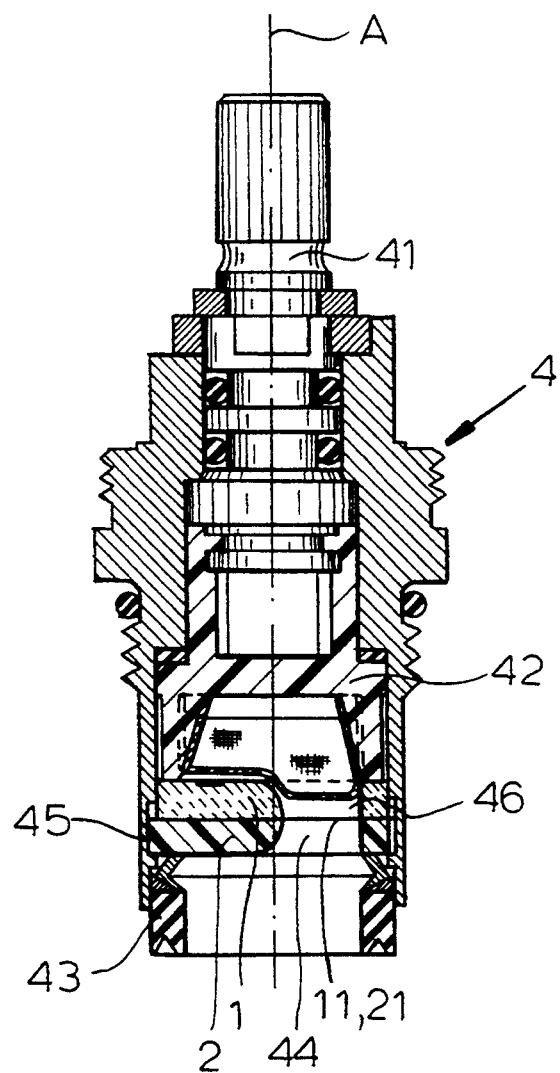
FIG. 1 is an axial section through a flow-control valve according to this invention.
Figure 2:
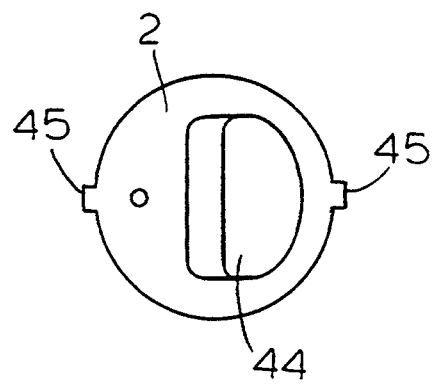
FIGS. 2 and 3 are top and axial sectional views, respectively, of the valve plate of the assembly of FIG. 1.
Figure 3:
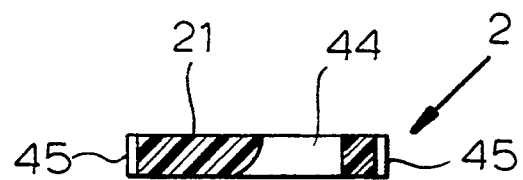

As seen in FIGS. 1 through 3 a valve according to this invention has a housing 4 provided internally with a hard-ceramic control plate 1 and a synthetic-resin valve plate 2. A stem 41 is fixed in a control element 42 that can move the control element, here by rotating it about a valve axis A, on the valve plate 2 which is formed with diametrally opposite tabs 45 (FIGS. 2 and 3) that keep it stationary in the housing 4. This plate 2 is also formed with a main port 44 from which flow can be blocked by turning the upper plate 1 through 180° into a position in which its port 46 does not register with it, the outflow from the upper port 46 taking place through an unillustrated side port in the housing 4. An annular elastic seal 43 is provided around the bottom of the assembly for sealing and for urging lower and upper faces 11 and 21 of the plates 1 and 2, respectively, against each other.

These surfaces 11 and 21 are substantially perfectly planar, produced by machining or, in the case of the body 2 which is made of polypropylene, by injection molding. Thus the polishing necessary for the prior-art hard-ceramic systems is spared.

Figure 4:
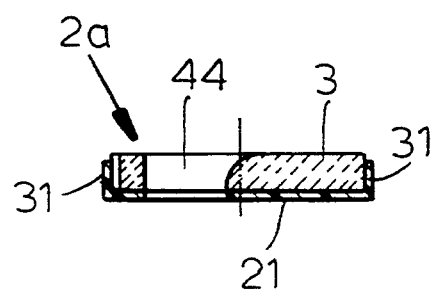
FIGS. 4 and 5 are views like FIGS. 3 and 2, respectively, but showing another valve plate according to the invention usable in the valve of FIG. 1.
Figure 5:
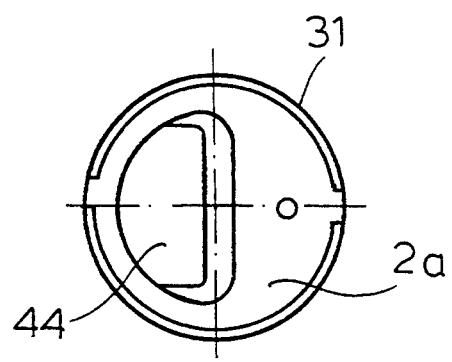

FIGS. 4 and 5 show a valve plate 2a identical to that of FIGS. 1 through 3 except that it is formed of a rigid plate body 3 formed of sintered metal or ceramic powder or the like and provided with a cap 31 of a low-friction synthetic resin, here polyethylene, forming the surface 21. An adhesive is provided at the interface between the cap 31 and the body 3 to retain these two parts together.

Figure 6:
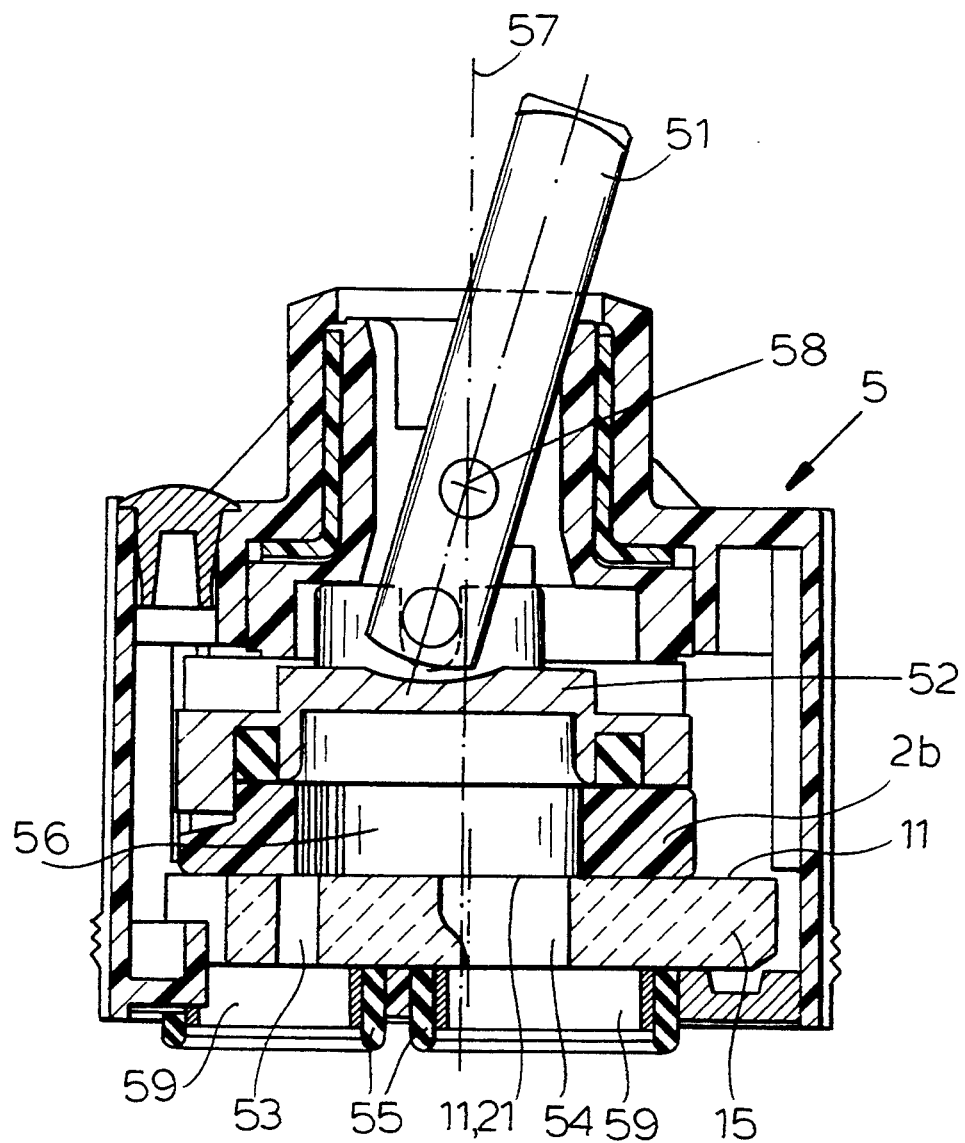
FIG. 6 is an axial section through a flow-control and mixing valve according to this invention.
Figure 7:
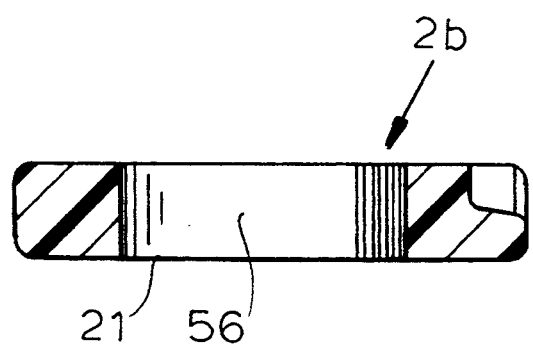
FIGS. 7 and 8 are axial sectional and top views of the valve plate of the assembly of FIG. 6.
Figure 8:
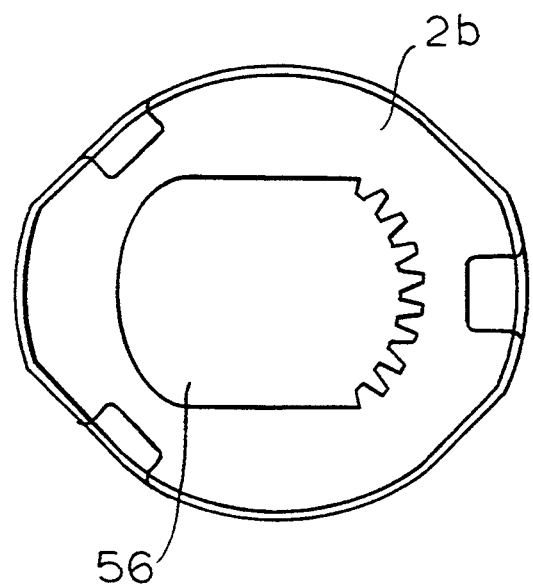

The valve shown in FIGS. 6 through 8 corresponds generally to the type described in German patent document 3,510,835 and in U.S. Pat. No. 4,995,419 and serves not only for controlling flow, but also for mixing two flows. To this end the valve has a housing 5 whose base is formed with two inlet and one outlet passages 59 that are connected as is known per se to conduits and surrounded here by seal rings 55. A normally stationary ceramic valve disk 15 formed with passages 53 and 54 aligned with the passages 59 of the housing 5. Atop this disk 15 is a control plate 2b formed with a cross-flow cavity 56 that can allow fluid flow from either or both of the respective inlets to the outlet, as is well known per se. A lever 51 pivoted at 58 in the housing 5 and on a member 52 fixed to the plate 2b can move this disk 2b back and forth to vary the volume of flow from the inlet passages to the outlet passage and from side to side to vary the temperature of the outputted water.

The valve body 15 is made of a hard ceramic and is axially displaceable but nonrotatable in the housing 5. The body 2b is made as a massive block of polyethylene.

Figure 9:
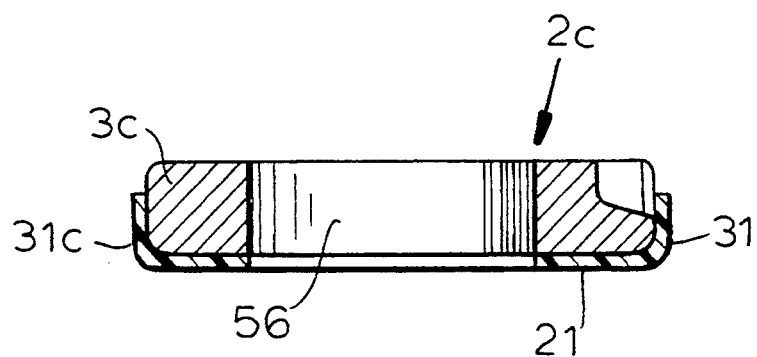
FIGS. 9 and 10 are axial sectional and top views of another valve plate in accordance with the invention usable in the valve of FIG. 6.
Figure 10:
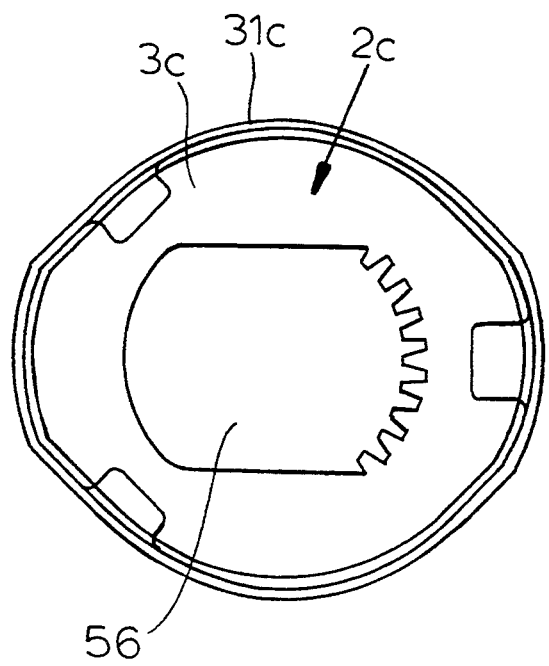

In FIGS. 9 and 10 show a valve plate 2c identical to that of FIGS. 6 through 8 except that it is formed of a rigid plate body 3c formed of sintered metal or ceramic powder or the like and provided with a cap 31c of a low-friction synthetic resin, here polyethylene, forming the surface 21. An adhesive is provided at the interface between the cap 31 and the body 3 to retain these two parts together.

I claim:

1. In a single-control valve having
    a normally stationary valve plate formed with at least one inlet port opening at a flat face of the valve plate,
    a movable control plate having a flat face lying on the valve-plate face and formed with a cavity opening at the control-plate face and juxtaposable over the port, and
    means for shifting the control plate on the valve plate with the two faces sliding on each other in flat surface contact, the improvement wherein
    at least one of the plates and its surface are formed of a hard ceramic, and
    at least the surface of the other of the plates is formed of polyethylene or polypropylene.

2. The improved valve defined in claim 1 wherein the other plate is entirely formed of the polyethylene or polypropylene.

3. The improved valve defined in claim 1 wherein the other plate comprises a rigid support body and a layer of the polyethylene or polypropylene forming the surface on the body.

4. The improved valve defined in claim 3 wherein the body is provided on its face with the polyethylene or polypropylene.

5. The improved valve defined in claim 4 wherein the layer of polyethylene or polypropylene is formed as a cap on the body.

6. The improved valve defined in claim 5, further comprising an adhesive securing the cap to the body.

7. The improved valve defined in claim 4 wherein the cap is fixedly anchored to the body.

8. The improved valve defined in claim 1, further comprising
    means for elastically urging the two faces against each other.

9. The improved valve defined in claim 1 wherein the faces are substantially planar.

* * * * *